United States Patent
Treadway

[11] Patent Number: 5,907,000
[45] Date of Patent: May 25, 1999

[54] ADJUSTABLE REFRACTIVE INDEX COATING COMPOSITION

[75] Inventor: Gerald D. Treadway, Penngrove, Calif.

[73] Assignee: The Walman Optical Company, Minneapolis, Minn.

[21] Appl. No.: 08/814,166

[22] Filed: Mar. 7, 1997

[51] Int. Cl.$^6$ ...................................................... C08F 2/46
[52] U.S. Cl. .............................. 522/79; 522/83; 522/84; 522/96; 522/182
[58] Field of Search .................................. 522/79, 83, 84, 522/96, 182

[56] References Cited

U.S. PATENT DOCUMENTS

| | | |
|---|---|---|
| 2,942,019 | 6/1960 | Pike et al. . |
| 3,166,527 | 1/1965 | Ender . |
| 3,291,775 | 12/1966 | Holm . |
| 3,591,408 | 7/1971 | Marzocchi et al. . |
| 3,837,876 | 9/1974 | Mayuzumi et al. . |
| 3,961,977 | 6/1976 | Koda et al. . |
| 3,986,997 | 10/1976 | Clark . |
| 4,027,073 | 5/1977 | Clark . |
| 4,029,842 | 6/1977 | Yoshida et al. . |
| 4,098,840 | 7/1978 | Yoshida et al. . |
| 4,196,014 | 4/1980 | Taniyama et al. . |
| 4,208,503 | 6/1980 | Martin . |
| 4,241,116 | 12/1980 | Taniyama et al. . |
| 4,378,250 | 3/1983 | Treadway et al. . |
| 4,426,431 | 1/1984 | Harasta et al. . |
| 4,613,560 | 9/1986 | Dueber et al. ........................... 430/286 |
| 4,623,676 | 11/1986 | Kistner . |
| 4,668,601 | 5/1987 | Kistner . |
| 4,719,416 | 1/1988 | Hohage et al. . |
| 4,822,828 | 4/1989 | Swofford ................................... 522/84 |
| 4,855,180 | 8/1989 | Kawamura . |
| 4,895,767 | 1/1990 | Mori et al. . |
| 5,221,560 | 6/1993 | Perkins et al. . |
| 5,242,719 | 9/1993 | Medford et al. .......................... 522/83 |
| 5,314,947 | 5/1994 | Sawaragi . |
| 5,367,019 | 11/1994 | Sawaragi . |
| 5,385,955 | 1/1995 | Tarshiani et al. . |

FOREIGN PATENT DOCUMENTS

| | | |
|---|---|---|
| 576 247 | 12/1993 | European Pat. Off. . |
| WO 94/10230 | 5/1994 | WIPO . |

*Primary Examiner*—Erma Cameron
*Attorney, Agent, or Firm*—Fredrikson & Byron, PA

[57] ABSTRACT

A curable composition for coating eyeglass lenses and other transparent substrates and capable of producing a hard coating, the index of refraction of which can be easily matched, through proper formulating, to the index refraction of the substrate to be coated to thereby avoid visible interference fringes. The composition comprises, in an organic solvent, a plurality of acrylate or methacrylate-functional monomers or oligomers and specifically including a (meth) acrylate-functional monomer having an (meth)acrylate-functionality of at least three and, when cured by itself, having a predetermined index of refraction. Optionally and preferably, the coating composition includes as well a different (meth)acrylate monomer having a functionality of one or more and, when cured by itself, exhibiting a different predetermined index of refraction. Desirably included in the composition is a polymerization catalyst capable of catalyzing polymerization of the (meth)acrylate monomers or oligomers in response to actinic radiation or thermal activation. The composition also includes a colloidal sol of a metal compound, preferably the oxide, of a metal such as antimony, antimony pentoxide being preferred.

14 Claims, No Drawings

5,907,000

ADJUSTABLE REFRACTIVE INDEX COATING COMPOSITION

BACKGROUND OF THE INVENTION

The invention relates to the field of transparent coatings for transparent objects such as eyeglass lenses, windows and the like, and refers particularly to a coating having an index of refraction essentially equal to that of the substrate that is coated.

Transparent plastic materials such as eyeglass lenses, television screen face plates and the protective coatings on photographic prints often are quite soft and are subject to becoming dull and hazy due to scratching and abrasion during use. Polycarbonate eyeglass lenses, for example, are strong and shatter resistant but also are relatively soft and susceptible to scratching. Television screen face plates similarly are made of flexible, shatter resistant plastic materials such as polycarbonate and poly (methylmethacrylate), and these also can be scratched or abraded.

Various coatings have been proposed for eyeglasses and other transparent plastic materials to reduce their propensity to become scratched and abraded. One such composition is shown in U.S. Pat. No. 4,378,250 (Treadway, et al.) granted Mar. 29, 1983. Other coatings are shown in U.S. Pat. No. 5,367.019 (Sawaragi), U.S. Pat. No. 4,855,180 (Kawamura), U.S. Pat. No. 4,895,767 (Mori et al.) and U.S. Pat. No. 4,719,146 (Hohage et al.)

In connection with lenses or other transparent substrates that bear protective coatings, if the refractive index of the coating varies even slightly from the refractive index of the substrate, visible and undesirable interference fringes will appear, particularly when the surface is viewed from an angle rather than p)erpendicular to the surface. Efforts have been made to produce coatings having high indices of refraction with the expectation that such coatings will avoid the interference fringe problem. Reference is made to Sawaragi et al., U.S. Pat. Nos. 5,367,019 and 5,314,947, referred to above. Such coatings have not been entirely satisfactory because they require thermal curing, which may lengthen production schedules and which also may not be appropriate for use with heat-sensitive substrates.

Thus, a coating is needed that is capable of producing a very hard and abrasion resistant surface upon curing, that has a refractive index that can be matched to the refractive index of the substrate to be coated, and that preferably can be cured quickly and easily.

SUMMARY OF THE INVENTION

The present invention in one embodiment provides a coating composition for eyeglass lenses and other transparent substrates and which is capable of producing a hard coating, the index of refraction of which can be easily matched, through proper formulating, to the index refraction of the substrate to be coated, to thereby avoid visible interference fringes.

In its preferred embodiments, the coating exhibits good adhesion to substrates without the need for intermediate primers or surface pretreatments. Speaking broadly, the invention provides a curable composition in an organic solvent, the composition comprising a plurality of acrylate or methacrylate-functional monomers or oligomers and specifically including a (meth)acrylate-functional monomer having an (meth)acrylate-function of at least three and, when cured by itself, having a predetermined index of refraction. Optionally and preferably, the coating composition includes as well a different (meth)acrylate monomer having a functionality of one or more and, when cured by itself, exhibiting a different predetermined index of refraction. Curing can be accomplished by means of electron beam activation, actinic (e.g., ultraviolet) radiation or, less preferably, thermal activation. Desirably included in the composition is a polymerization catalyst capable of catalyzing polymerization of the (meth)acrylate monomers or oligomers in response to actinic radiation or thermal activation. The composition also includes a colloidal sol of metallic compound, preferably a metal oxide, of a metal such as antimony, antimony pentoxide being preferred. The colloidal sol is present in an amount sufficient to provide the coating composition with from about 1% to about 60% of colloidal solids. The coating composition desirably includes a compatibility enhancing material particularly at the higher concentration of colloid particles, such compatibility enhancing materials being exemplified as (meth)acrylate-functional silanes, amine-modified epoxy diacrylates, mercapto silanes and amine functional silanes, the latter being preferred.

DESCRIPTION OF THE PREFERRED EMBODIMENT

The solvent employed in the coating compositions of the invention is organic and preferably is a lower boiling alcohol such a $C_1$–$C_4$ alcohol (ethanol and isopropanol being preferred), a ketone such as acetone, methyl ethyl ketone, methyl propyl ketone, methyl isobutyl ketone, or mixtures thereof. Low boiling organic solvents generally are preferred because they permit a thin coating of the composition to dry quickly. However, in some instances it may be desired to employ one or more higher boiling solvents for the purpose of obtaining uniform, defect-free coatings, and solvents such as the glycol ethers (e.g., propylene glycol monomethyl ether) are appropriate for this purpose.

A wide variety of monomers and oligomers can be employed in the coating composition of the invention. To develop hardness, however, it is desired that the coating composition include at least one (meth)acrylate-functional monomer that has a functionality of at least three. Exemplary of monomers or oligomers of this type are dipentaerythritol hydroxy pentacrylate, di (trimethylol propane) tetraacrylate, urethane acrylates and other multifunctional urethanes, such as Ebecryl 8301 (a product of UCB Chemicals Corp.), trimethylol propane triacrylate and pentaerythritol tetraacrylate. Of these, dipentaerythritol hydroxy pentacrylate is preferred. Optional monomers can include α-epoxy propyl trimethoxy silane and other epoxy functional non-silane compounds such as trimethylol propane triepoxide. If epoxy functional monomers are used, the curable composition preferably also contains a cationic polymerization photoinitiator such as one or a mixture of triarylsulfonium hexafluoroantimonate salts.

Other (meth)acrylate monomers or oligomers that can be used can be chosen from the wide variety of known monomers and oligomers. Desirably, the (meth)acrylate monomers or oligomers include at lease one aromatic monomer such as bisphenol A diacrylate or diacrylate esters of a Bisphenol A diepoxide (as is available commercially as Ebecryl 600 (UCB Chemicals Corp.). The aromatic (meth) acrylates form polymers with higher indices of refraction, and these accordingly are valuable in adjusting the index of refraction of the coating, which more will be said below. Also valuable are the sulfur-containing (meth)acrylates. Halogenated (meth)acrylates such as tetrabromo Bisphenol A diacrylate and also valuable since the presence of halogen tends to substantially increase the index of refraction of the resulting polymer.

The (meth)acrylate-functional monomers and oligomers (the term (meth)acrylate referring to both the acrylate and the methacrylate radicals) desirably includes di(meth) acrylates and may include lower molecular weight monomers such as (meth)acrylic acid and methylmethacrylate, although the latter monomers are preferably used, if at all, only as a relatively small proportion of the (meth)acrylate monomer or oligomer constituent.

As pointed out below, the index of refraction of the coating that is obtained will depend upon the indices of refraction of the polymers that would be formed if the polymerizable components were polymerized separately, and is particularly dependent upon the concentration and the index of refraction of the colloidal sol.

An estimate of the index of refraction of the polymer portion of the coating (minus the colloidal sol) can be obtained. Recognizing that each monomer or oligomer in the coating composition, if cured by itself, would produce a polymer having its own specific index of refraction, one can assume that each monomer or oligomer contributes to the index of refraction of the coating formed by the polymerizable constituents of the coating composition in an amount equal to its proportion by weight of the polymerizable constituents. If, for example, the coating composition contained equal weights of only two monomers, one can estimate the index of refraction of the resulting polymer by adding together one half of the index of refraction of the polymer resulting from the homopolymerization of each monomer separately. For example, polymers derived from dipentaerythritol hydroxy pentacrylate and from Bisphenol A diacrylate have indices of refraction of 1.484 and 1.5294, respectively. A polymer derived from equal amounts by weight of these monomers would be expected to have an index of refraction of about 1.507, the dipentaerythritol hydroxy pentacrylate contributing a value of 1.484/2=0.742 and the Bisphenol A diacrylate contributing a value of 1.5294/2=0.765.

The (meth)acrylate-functional monomers and oligomers can be employed in the invention thus are selected to provide the desired blend of film hardness and index of refraction. Because only very slight differences in index of refraction between the coating and substrate can lead to observable interference fringes, formulation of coating compositions of the inventions can be an iterative process in which one first creates a coating composition having a calculated index of refraction approximately equal to that of the substrate, and then cures a film of the composition on the substrate. The observance of even a slight interference fringe indicates that the indices of refraction of the coating and substrate are slightly different, but it is difficult to tell from this observance whether the index of refraction of the coating is too high or too low. An adjustment then can be made to the proportions of monomers or polymers, or to the colloid content, or both, to cause a slight change in the index of refraction of the resulting coating and the test is repeated, the formulation being adjusted until a coating having the desired index of refraction is obtained.

The colloidal sol ingredient of the invention can be any of several colloidal sols in an organic solvent. Preferred are colloids of compounds, preferably oxides, of such metals as antimony, bismuth, tin, cerium, and zirconium. Particularly preferred is antimony pentoxide in a concentration of about 30% solids by weight in methanol. Mixtures of colloids can also be employed, and it has been sound particularly desirable in the case of colloidal mixtures to first obtain a colloidal suspension of each colloid species, and then mix together the suspensions, rather than attempt to make a colloidal suspension of a mixture of several special of colloidal particles. The use of colloidal antimony pentoxide provides an easy method of controlling the index of refraction of the resulting protective coating. One may vary the index of refraction by varying the amount of antimony pentoxide that is added. It appears that the colloidal antimony pentoxide may also contribute to the abrasion resistance of the coating.

Silica is another colloidal material that can be employed in the coating composition of the invention. Colloidal silica is particularly valuable in imparting scratch resistance to the resulting polymer coating. Other appropriate colloids include tin oxide, alumina or aluminum trihydrate, cerium oxide and zirconium oxide.

Preferably, the coating compositions of the invention, on a solids basis, contain from about 1% to about 60% by weight of the metallic colloid. Viscosity of the coatings depends to some extent upon the solids concentration, and the latter may be adjusted as desired to meet coating equipment requirements.

Depending upon the nature of the solvent system and the coating composition ingredients (including the polymer precursors (the (meth)acrylate and other monomers and oligomers), and the nature and concentration of the colloidal sol, the coating composition may be slightly hazy due to incompatibility of the colloidal sol. This can often be rectified by adding to the coating composition a small quantity of a compatibility enhancing material. Such materials include amine-modified epoxy diacrylates such as Ebecryl 3600, (UCB Chemicals Corp.), (meth)acryl silanes such as methacryloxypropyl triethoxy silane, and mercapto silanes including such g-mercaptoalkyl trialkoxy silanes as g-mercaptopropyl trimethoxy silane. Preferred as compatibility-enhancing compounds are the α-aminopropyl trialkoxy silanes, particularly α-aminopropyl trimethoxysilane.

Finally, the coating composition should contain a radical initiator, and several types can be employed. Preferred for the composition of the present invention are photoinitiators such as those based upon benzophenone. A preferred initiator is 1-hydroxycyclohexylphenyl ketone (Iragacure 184™, Ciba-Geigy, Ardsley, N.Y.). Also useful for compositions of the present invention are thermally activated initiators such as azo bis (isobutyronitrile) and the commonly used peroxide initiators such as benzoyl peroxide.

Other ingredients can be employed as well in the coating compositions of the invention. Additional ingredients are desirably substantially transparent. Flow control agents, in particularly the fluorocarbon flow control agents such as FC-430, a nonionic fluorochemical (3M Company), may be employed to help in obtaining a smooth solvent-containing coating on a substrate and the avoidance of pinholes and other defects as solvent is removed from the coating. Solvent as needed may be added to the composition, and the coating compositions of the invention may have consistencies consonant with the intended coating method. For example, coating compositions that are to be used by dipping a substrate into the solution may have solids concentrations in the range of 15–20 percent and water-like viscosities. For spin coating or drawbar coating, a somewhat greater viscosity is desired, and solids contents in the range of 35–40 percent are appropriate here.

Various coating procedures can be employed with the composition of the invention. Continuous coating of eyeglass lenses can be accomplished in automated equipment by dipping the lenses into a composition of the invention, permitting excess liquid to drip from the lenses, the lenses subsequently being exposed to an infrared heat source to drive off solvent, followed by exposure to a radiation source such as a UV source to cause polymerization of the acrylate-functional monomers and/or oligomers. Spin coating can also be employed in which the substrate to be coated is positioned horizontally and is spun about a vertical axis passing centrally through the substrate. A small amount of the composition of the invention is then placed centrally of the substrate and allowed to spread outwardly by centrifugal force. Various other coating procedures can also be employed, such as coating from a roller that is dipped into a container of coating material, through the use of doctor blades, spray applicators, and the like.

The resistance of coatings of the invention to scratch or abrade can be measured by rubbing the surface with an abrasive material under controlled conditions and measuring the haze that is formed as a reduction in light transmissivity. One such testing apparatus is referred to as a Taber Abrader, a product of Byk-Gardner. Abrasion resistance testing with this equipment may be performed in accordance with ASTM D 1044-78. The particular equipment employed for testing coatings of the invention referred to below involved a model 5130 Taber abrader equipped with abrasive wheels weighted at 500 grams.

Although the index of refraction of a coating of the invention can be measured using commercially available optical equipment, in the end it is important only that the index of refraction of the coating match the index of refraction of the transparent substrate being coated, and this in turn can be determined perhaps most easily by visual inspection of the coated substrate to determine the presence or absence of interference fringes. It appears that simply by using careful visual inspection, noting the presence or absence of interference fringes, differences in refractive index between the coating and the substrate of as little as 0.025 can be determined.

Adhesion of the cured coating to the substrate is also of importance. Adhesion can be measured under the provisions of ASTM 3359 which, in brief, provides for the scoring of the cured coating in a cross-hatch fashion followed by an attempt to lift cross hatched portions of the coating from the substrate through the use of a pressure sensitive adhesive tape that is applied to the cross hatched surface and then pulled away, the degree to which the cross-hatched portions of the coating remain adhered to the substrate providing a measure of adhesion to that substrate.

The invention may be better understood and appreciated by reference to the following non-limiting examples:

EXAMPLE 1

The following ingredients were added in the sequence listed to a glass container and were mixed gently to avoid entrainment of air:

| | |
|---|---|
| Antimony Pentoxide Colloidal Sol (AMT-130S ™, Nissan Chemicals, 30% by weight in methanol) | 150 grams |
| Dipentaerythritol hydroxy pentacrylate | 22 grams |
| Bisphenol A diacrylate | 23 grams |
| g-Aminopropyl triethoxy silane | 4 grams |

The resulting mixture was allowed to stand for at least 16 hours at room temperature until a thin film prepared from the composition was completely clear and showed no sign of haze. To the resulting material was added:

| | |
|---|---|
| 2-hydroxy-2-methyl-1-phenylpropane-1-one photoinitiator (Darocure 1173 ™, Ciba-Geigy Corporation) | 2.25 grams |
| Methyl propyl ketone | 68 grams |
| Flow control agent (FC 430 ™, 3M Company) | 0.04 grams |

The resulting product was carefully mixed to form a uniform, transparent, haze-free composition. A sample of the solution was spin coated upon a polycarbonate substrate to a thickness of approximately 20 microns (wet basis) and was dried and cured by exposure to a medium pressure mercury bulb for 20 seconds. No evidence of an interference fringe was observable to the unaided eye. The cured coating lost seven percent of its light transmittance when subjected to the Taber abrasion test referred to above through 200 revolutions.

EXAMPLE 2

The following ingredients were added in sequence to a glass container and were gently mixed to avoid entrainment of air:

| | |
|---|---|
| Antimony pentoxide colloidal sol (30% in methanol) | 150 grams |
| Dipentaerythritol hydroxy pentacrylate | 27.0 grams |
| Amine-modified epoxy diacrylate (Ebecryl 3600 ™, a product of UCB Chemicals Corp.) | 20.0 grams |

The mixture was allowed to stand for over 16 hours at room temperature until a thin film of the composition at a thickness of about 6–10 microns showed no signs of haze or milkiness. To the composition then was added, in order:

| | |
|---|---|
| 2-hydroxy-2-methyl-1-phenylpropane-1-one (Darocure 1173 ™ photoinitiator) | 2.25 grams |
| Methyl propyl ketone | 68 grams |
| Flow control agent (FC 431 ™, 3M Company) | 0.4 grams |

After coating, drying and curing of the composition as in the previous example, adhesion and resistance to abrasion were measured. Upon performing ASTM 3359, 100% of the coating remained adhered to the substrate. The cured coating lost 9.7% of its light transmittance when subjected to the Taber abrasion test referred to above through 200 revolutions.

EXAMPLE 3

The following ingredients were added to a glass container in order and were gently mixed to achieve homogeneity:

| | |
|---|---|
| Antimony Pentoxide Colloidal Sol | 150 grams |
| Dipentaerythritol hydroxy pentacrylate | 27.0 grams |
| Bisphenol A diacrylate (Ebecryl EB 150, UCB Chemicals Corp.) | 20 grams |
| Methacryloxypropyl triethoxy silane | 4 grams |

The transparent, homogeneous mixture was allowed to stand for over 24 hours until a thin film of the material appeared haze-free, following which the following ingredients were added in order:

| | |
|---|---|
| 2-hydroxy-2-methyl-1-phenylpropane-1-one (Darocure 1173 ™ photoinitiator) | 2.25 grams |
| Methyl propyl ketone | 68 grams |
| Flow control agent (FC 430, 3M Company) | 0.4 grams |

After coating, drying and curing of the composition as in the previous example, adhesion and resistance to abrasion were measured. 100% of the coating remained adhered to the substrate, and The cured coating lost 7.5% of its light transmittance when subjected to the Taber abrasion test referred to above through 200 revolutions.

EXAMPLE 4

The following ingredients were added to a glass container in order and were gently mixed to achieve homogeneity:

| | |
|---|---|
| Antimony Pentoxide Colloidal Sol | 15 grams |
| Dipentaerythritol hydroxy pentacrylate | 2.2 grams |
| α-methacryloxypropyl triethoxy silane (A-174, OSI Corp.) | 0.1 grams |

The mixture was allowed to stand until a thin film of the composition showed no signs of haze or milkiness. To the composition then was added, in order:

| | |
|---|---|
| Bisphenol A diacrylate | 2.0 grams |
| Colloidal silica (30% NV in ethanol) | 3.3 grams |
| 2-hydroxy-2-methyl-1-phenylpropane-1-one | 0.11 grams |
| Fluorochemical surfactant (FC 430, 3M Co.) | 0.4 grams |

A sample of the coating was spin coated onto a polycarbonate substrate and cured under conditions similar to those of Example 1. No interference fringe was noted. Adhesion to the polycarbonate substrate was not good, but the coating exhibited excellent resistance to abrasion.

While a preferred embodiment of the present invention has been described, it should be understood that various changes, adaptations and modifications may be made therein without departing from the spirit of the invention and the scope of the appended claims.

What is claimed is:

1. A curable coating composition comprising, in an organic solvent, a polymeric precursor comprising an acrylic functional monomer or oligomer including a monomer or oligomer having an acrylic functionality of three or greater, and a colloidal sol of a metallic colloid.

2. The coating composition of claim 1 including a radical initiator which is capable of initiating polymerization of said polymeric precursor upon activation with electron beam activation, actinic radiation, or thermal activation.

3. The coating composition of claim 2 wherein said radical initiator capable of initiating polymerization of said polymeric precursor in response to exposure to ultraviolet light.

4. The coating composition of claim 1 wherein said polymer precursor includes a mixture of (meth)acrylate monomers or oligomers.

5. The coating composition of claim 4 wherein said mixture includes a diacrylate monomer or oligomer.

6. The coating composition of claim 4 wherein said mixture includes dipentaerythritol hydroxy pentacrylate.

7. The coating composition of claim 1 including colloidal silica.

8. A curable coating composition comprising, in an organic solvent, a polymeric precursor comprising a mixture of acrylic functional monomers or oligomers including a monomer or oligomer having an acrylic functionality of three or greater, a colloidal sol of a metallic colloid, and a radical initiator capable of initiating polymerization of said polymeric precursor upon activation with actinic radiation.

9. The coating composition of claim 8 including a second colloidal sol comprising colloidal silica.

10. The coating composition of claim 8 wherein said polymeric precursor includes an epoxy-functional monomer and a cationic initiator therefor.

11. A curable coating composition comprising, in an organic solvent, a polymeric precursor comprising a mixture of acrylic functional monomers or oligomers including a monomer having an acrylic functionality of three or greater, a colloidal sol of a metallic colloid at a concentration of from about 1% to about 60% by weight of the coating composition on a solids basis, and a radical initiator capable of initiating polymerization of said polymeric precursor upon activation with electron beam activation, actinic radiation, or thermal activation.

12. The coating composition of claim 11 wherein said mixture of acrylic functional monomers or oligomers includes dipentaerytbritol hydroxy pentacrylate.

13. The coating composition of claim 11 wherein said mixture includes a diacrylate monomer or oligomer.

14. A heat, electron beam or actinic radiation curable coating composition comprising, in an organic solvent, a polymeric precursor comprising an acrylic functional monomer or oligomer including a monomer or oligomer having an acrylic functionality of three or greater, and about 1% to about 60% by weight of a metallic colloidal sol.

* * * * *